(12) United States Patent
Prior et al.

(10) Patent No.: US 8,564,613 B2
(45) Date of Patent: Oct. 22, 2013

(54) DISPLAY MODIFICATION BASED ON MEASUREMENT TYPE

(75) Inventors: Matthew Prior, Plymouth, MN (US); Christopher Larsen, Rockford, MN (US); Christopher Holland, Mayer, MN (US)

(73) Assignee: Nonin Medical, Inc., Plymouth, MN (US)

( * ) Notice: Subject to any disclaimer, the term of this patent is extended or adjusted under 35 U.S.C. 154(b) by 106 days.

(21) Appl. No.: 12/794,230

(22) Filed: Jun. 4, 2010

(65) Prior Publication Data

US 2010/0309207 A1    Dec. 9, 2010

Related U.S. Application Data

(60) Provisional application No. 61/184,538, filed on Jun. 5, 2009.

(51) Int. Cl.
*G09G 5/00*    (2006.01)

(52) U.S. Cl.
USPC ........ 345/619; 345/440; 345/440.1; 345/581; 345/689

(58) Field of Classification Search
None
See application file for complete search history.

(56) References Cited

U.S. PATENT DOCUMENTS

| | | | |
|---|---|---|---|
| 7,990,382 B2 * | 8/2011 | Kiani | 345/440 |
| 2001/0010525 A1 * | 8/2001 | Fukuda et al. | 345/788 |
| 2004/0016431 A1 * | 1/2004 | Preveyraud | 128/204.18 |
| 2004/0204635 A1 * | 10/2004 | Scharf et al. | 600/323 |
| 2007/0247462 A1 * | 10/2007 | Bell et al. | 345/440 |
| 2008/0195967 A1 * | 8/2008 | Goode et al. | 715/781 |
| 2008/0300474 A1 * | 12/2008 | Benni et al. | 600/331 |
| 2010/0049468 A1 * | 2/2010 | Papadourakis | 702/141 |

* cited by examiner

*Primary Examiner* — Kee M Tung
*Assistant Examiner* — Jwalant Amin
(74) *Attorney, Agent, or Firm* — Schwegman Lundberg & Woessner, P.A.

(57) ABSTRACT

Systems and methods provide a measurement system that modifies the display format based on the type of measurements or and/or the value measured, and these modifications are automatically made based on the information stored within sensors, sensor pods and/or alarm limits.

26 Claims, 9 Drawing Sheets

DISPLAY MODIFICATION BASED ON MEASUREMENT TYPE

RELATED APPLICATION

The present application claims the benefit under 35 U.S.C. 119(e) of U.S. Provisional Patent Application Ser. No. 61/184,538, filed Jun. 5, 2009, which is incorporated herein by reference in its entirety.

FIELD

Embodiments of the inventive subject matter relate generally to measurement system and more particularly, to measurement systems having a display that is modified based on measurement types received by the system.

BACKGROUND

Many device exist that display data received from sensors. For example, hospitals, clinics and other health care facilities commonly use data received from sensors placed on or near a patient to monitor and/or diagnose a patient's condition. Some devices are capable receiving data from multiple sensors, and may also receive data from different types of sensors. Such devices typically require manual configuration or user input to determine the format of data displayed on the device.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Figure 1:
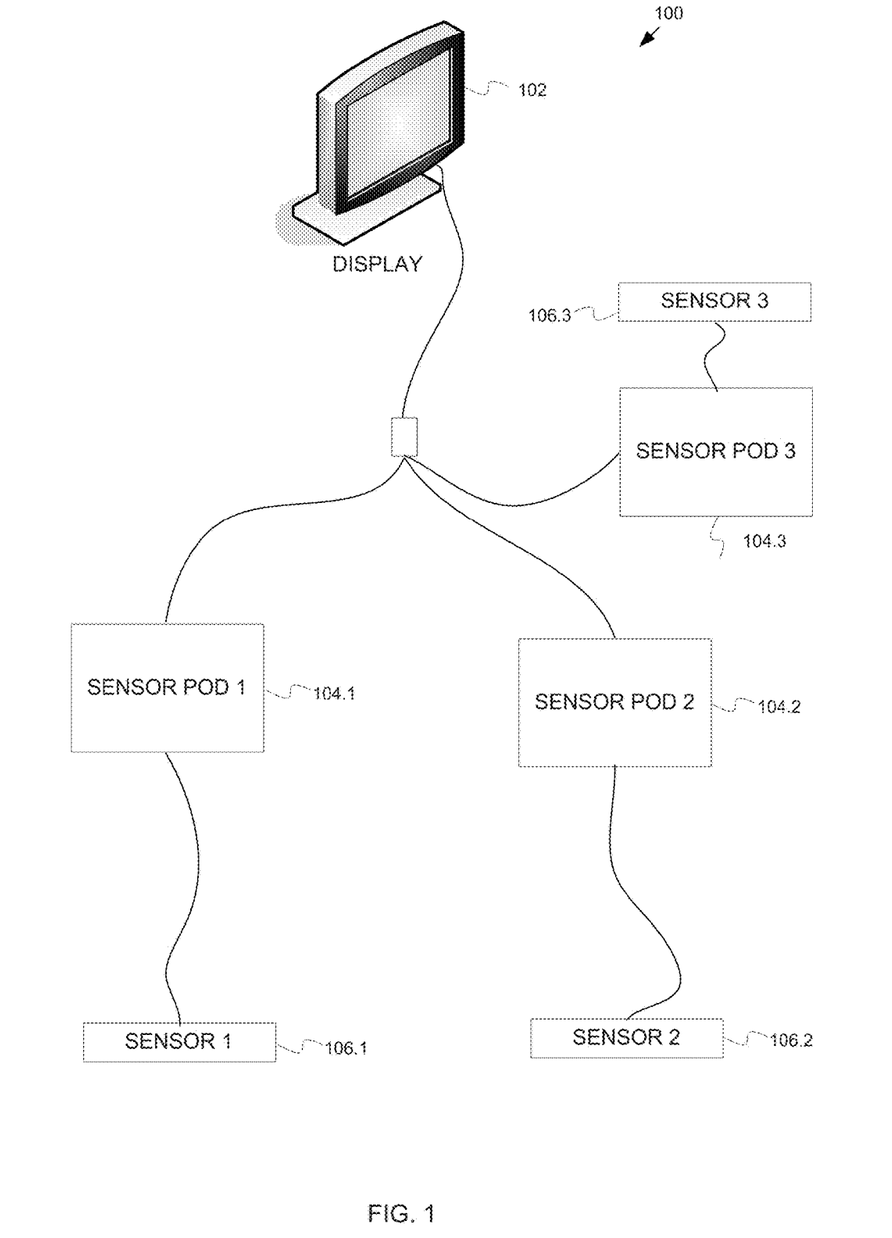
FIG. 1 illustrates a system incorporating embodiments of the invention.

FIG. 1 is a block diagram illustrating a measurement system according to embodiments of the invention. In some embodiments, measurement system 100 includes a display unit 102, a plurality of sensor pods 104.1-104.3, and sensors 106.1-106.3 coupled to sensor pods 104.1-104.3 respectively. Sensors 106 provide signals or data regarding a measurement. In some embodiments, measurement system 100 is a oximeter that measures oxygenation of hemoglobin. Various types of sensors and measuring systems are possible and within the scope of the inventive subject matter. For example, oximetry sensors may include regional oximetry sensors, pulse oximetry sensors, pediatric sensors and adult sensors. Additional types of sensors may include pulse sensors, heart monitoring sensors, brain monitoring sensors. The inventive subject matter is not necessarily limited to any particular type of sensor.

In some embodiments of the invention, system 100 includes a sensor pod 104. The sensor pod 104 receives data from sensors 106, and may process the data to produce resultant data that is sent to display 102. For example, in some embodiments, sensor pod 104 receives data representative of the amount of light passing through regions of a person's anatomy, and transforms the data into oxygen saturation values.

In alternative embodiments of the invention, sensors may be directly coupled to display unit 102.

Display unit 102 receives data (either from sensor pods 104 or from sensors 106) and displays the data on a display coupled to the display unit. Display unit 102 may include one or more processors and memory to execute in whole or in part the methods described below. The data may be subject to varying degrees of processing prior to display on the display unit.

Figure 2:
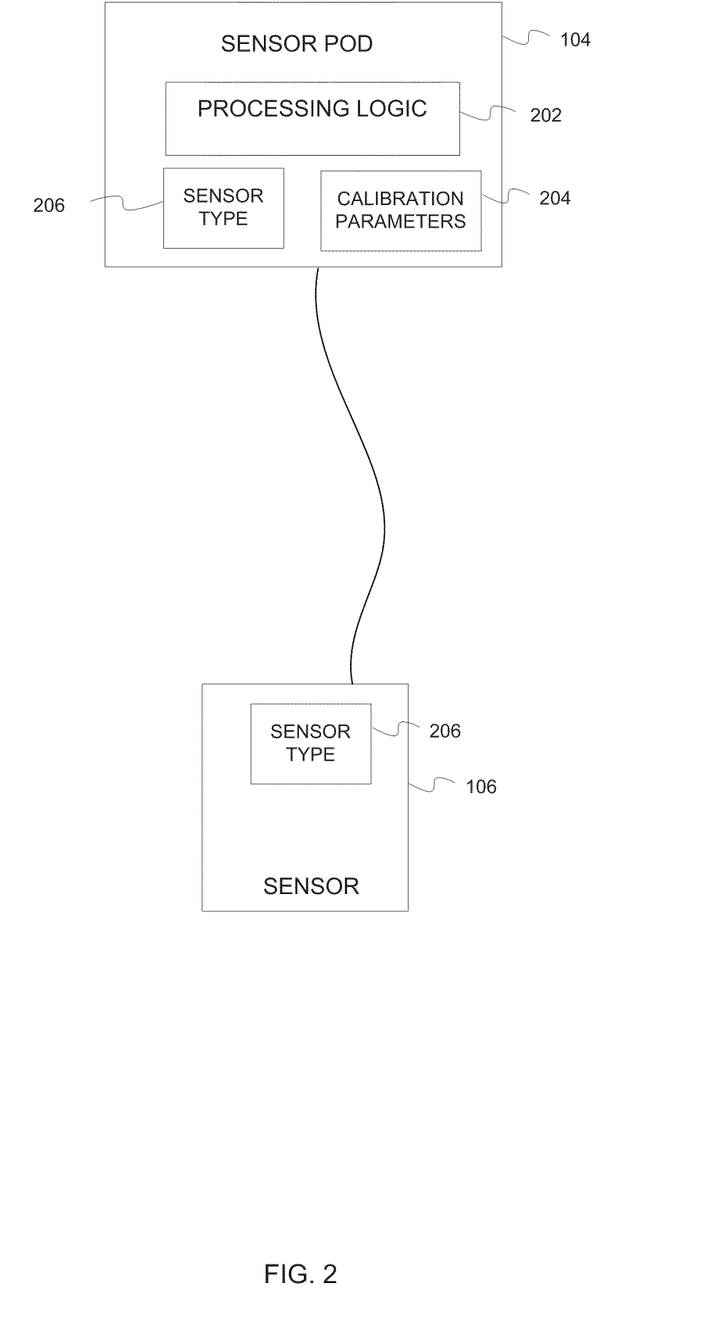
FIG. 2 provides further details of a sensor and sensor pod according to embodiments of the invention.

FIG. 2 provides further details on sensors and sensor pods according to embodiments of the invention. In some embodiments, a sensor 106 includes sensor type data 206 that indicates the type of sensor. For example, a type code may be used to indicate the type of sensor. Further, multiple type codes may be used to indicate aspects of the type of sensor. For example, certain type codes may be used to indicate adult vs. pediatric sensors while other type codes may be present to indicate whether the sensor is a regional or pulse oximetry sensor.

The sensor 106 or sensor pod 104 may store sensor type data 206, and may also include calibration parameters 204 (or coefficients) that are used by processing logic 202 in conjunction with the sensor type data to produce values to be sent to display unit 102. For example, a cerebral oximetry sensor for an adult may require the use of different calibration coefficients from a pulse oximetry sensor for a child. The sensor type data may be used by sensor pod 104 (or other component coupled to sensor 106) to apply the proper calibration coefficients to the sensor data.

Pod 104 in some embodiments includes processing logic 202 comprising one or more processors and memory. Processing logic 202 may include programming (stored on a memory) for executing an algorithm to evaluate or process data received from sensor 106. Processing logic 202 may also execute in whole or in part the methods described below. Other modules also contemplated for pod 104 include a communications module for communicating data to display unit 102, analog-to-digital converter (ADC), a digital-to-analog converter (DAC), a filter, an amplifier, and a power supply among others, some of which can be in the form of a discrete component or be implemented by means of processing logic 202. A power supply can include a battery.

In one embodiment, any of the components of the measurement system 100 can include hardware, firmware, and/or software for performing the operations described herein. Machine-readable media includes any mechanism that provides (e.g., stores and/or transmits) information in a form readable by a machine (e.g., a computer, server, processing node etc.). For example, non-transitory machine-readable media includes read only memory (ROM), random access memory (RAM), magnetic disk storage media, optical storage media, flash memory machines, etc. Machine-readable media also includes any media suitable for transmitting software over a network.

In various embodiments, the system may choose which format to display each data stream in based on the history of the data stream, for example if the blood oxygen saturation as measured by an oximetry sensor is consistent to within a set threshold, then display a photoplethysmograph, but if the consistency falls below a threshold, then display a trend line of change in saturation over time.

Example Operations

Figure 3:
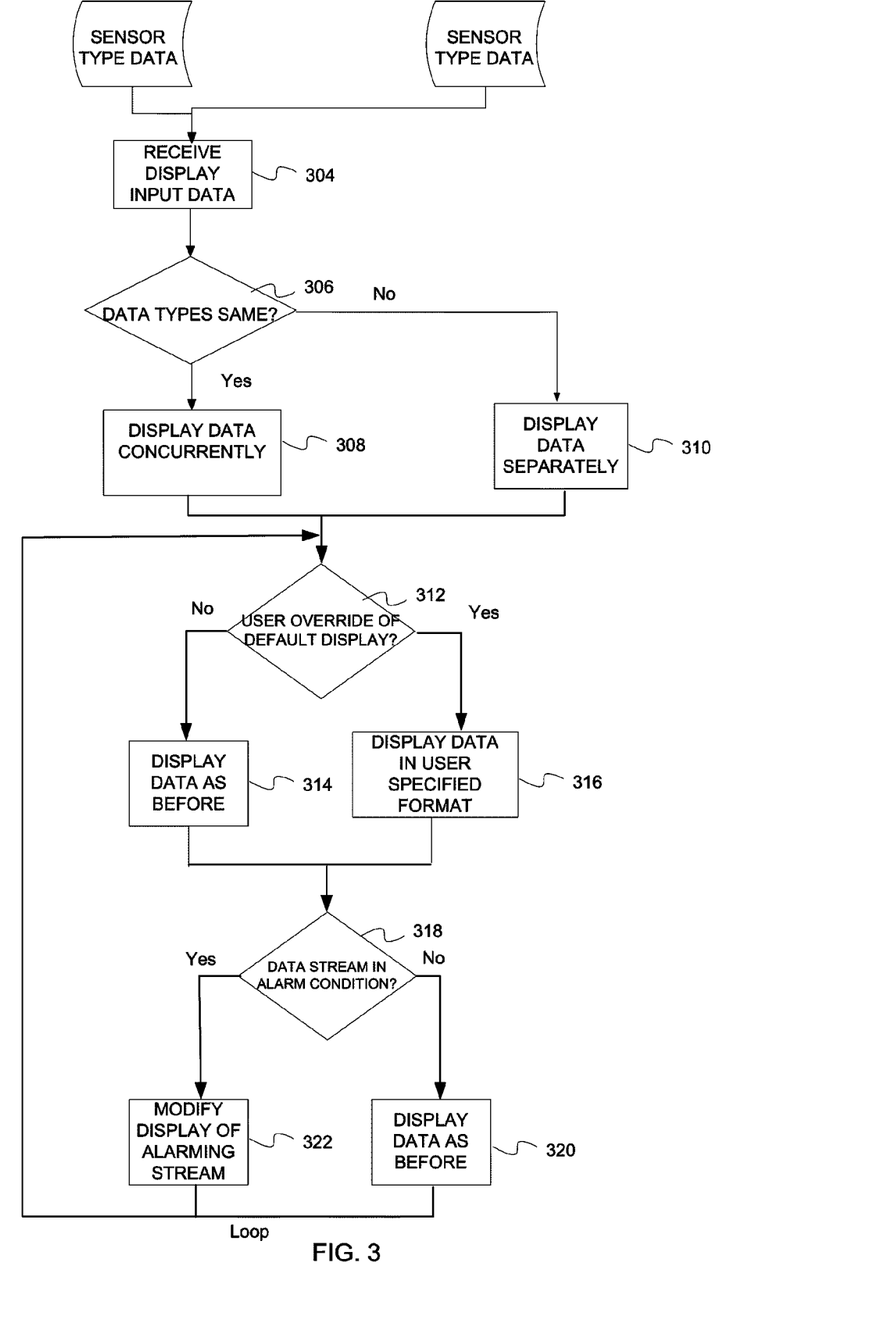
FIG. 3 is a flowchart illustrating methods according to embodiments of the invention.

FIG. 3 is a flow chart illustrating a method for using measurement or sensor type data to modify a display. The method begins at block 304 by receiving data input for one or more of a plurality of sensors 106 for a system. Typically the data input may be measurement data provided by the sensor. In addition, the data input may include data identifying the type of sensor, or the type of measurement provided by the sensor.

At block 306 a check is made to determine if the types of data provided by one or more of the sensors is the same as that provided by other sensors. If so, the method proceeds to block 308 to display the data for all sensors of the same type concurrently. In some embodiments, the concurrent display of data includes overlaying data received from sensors providing the same type of measurement onto a graph. In alternative embodiments, the concurrent display of data includes displaying data from sensors of the same type adjacent to one another.

If the check at block 306 indicates that a sensor is of a different type or provides different data, then at block 310 a system executing the method displays the data separately from other types of sensors. For example, the data may be placed in a different portion (side, corner etc.) of a display.

As can be seen from the above, the system executing the method may group the display of sensor data from sensors providing the same type of data together, while sensors providing different types of data may have their values displayed separately from other groups. As an example, a system may display oximetry data for various regions on one side of the screen and pulse data on the other side of the screen.

Other types of display modifications based on sensor type or data type are possible and within the scope of the inventive subject matter. For example, a system may determine whether to display the data as trend lines, as absolute values, as graphs, as plethismographs or as combinations of the above.

At block 312, a check is made to determine if a user has indicated that the display format determined by the system should be overridden. For example, a user may provide input such as a button press, menu selection, or activation of some user interface element to indicate that the display format determined automatically by the system should be overridden. If the default display format is to be overridden, the method proceeds to block 316 to display the data in an alternative format specified by the user. Otherwise, at block 314 the display format remains the same as determined by the system.

At block 318, a check is made to determine if any of the sensor data streams is in an alarm condition. An alarm condition may be triggered by data values crossing a threshold or alarm limit or equipment alarm such as a sensor disconnected or an equipment or sensor malfunction. An equipment alarm may be generated by display unit 102 or any device coupled to display unit 102 or sensor pod 104. The threshold or alarm limit may be determined by data stored on the display unit 102, sensor pod 104 or sensor 106. The alarm condition may be detected by the display unit 102, sensor pod 104, or a sensor 106. If a sensor data stream is not in an alarm condition, then at block 320 the display of the data continues in the previously determined format (either user-selected or system determined).

Otherwise, if the data stream from a sensor is in an alarm condition or otherwise crosses a predetermined threshold, then at block 322, the system modifies the display of data for the data stream. Various modifications are possible and within the scope of the inventive subject matter. Varying embodiments may cause the data to be displayed more prominently, e.g., in a larger font or larger portion of the display. Additionally, the display may highlight the data (bold, flashing, color change etc.) to indicate the alarm condition. Alternatively, if the alarm condition is the result of a disconnection or malfunction, the data may be displayed less prominently on the assumption that the data is not valid or not reliable.

In addition to modifying the format of the data display, the actual data displayed may be changed in response to detecting an alarm condition or detecting that a data value has crossed a threshold value. For example, a trend line for one measurement may be displayed, but upon detecting a threshold crossing alarm, the display may change to a trend line from another measurement.

The display format may be changed in realtime based on changes in the configuration of sensors attached to the system. For example, if a new sensor is added, or a sensor is replaced with a sensor of a different type, the display format may dynamically change based on the newly added sensor type.

In some embodiments, the display changes may be either temporary or periodically changed based on the alarm condition or data received. For example, the data display associated with an alarm condition may be made more prominent for a period of time, and then revert back to its previous size or style or change to yet a different display modification.

FIGS. 4-7 illustrate various example display screens produced according to various embodiments of the invention.

Figure 4:
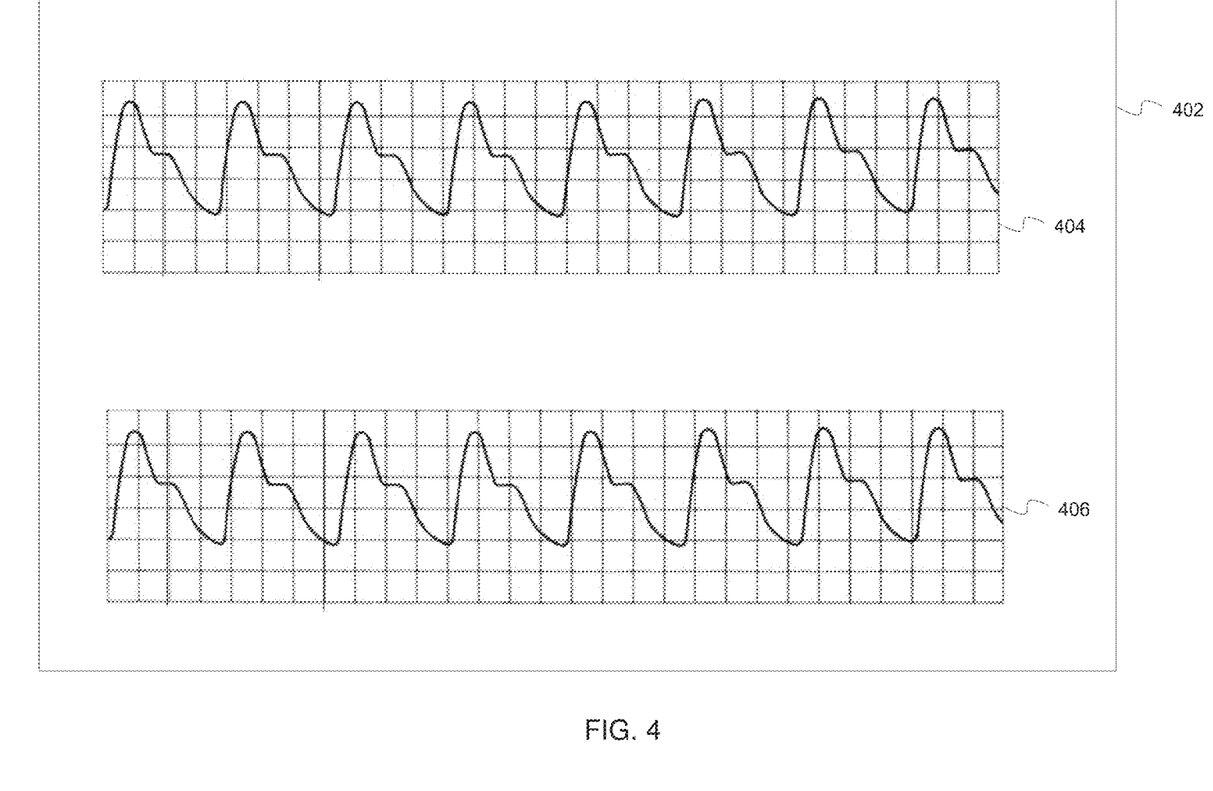
FIGS. 4-7 are example screen illustrations for displays that may be generated according to system and method embodiments of the invention.

FIG. 4 illustrates an example screen 402 in which two data streams 404 and 406 from two sensors having the same measurement type are concurrently display, one adjacent the other.

Figure 5:
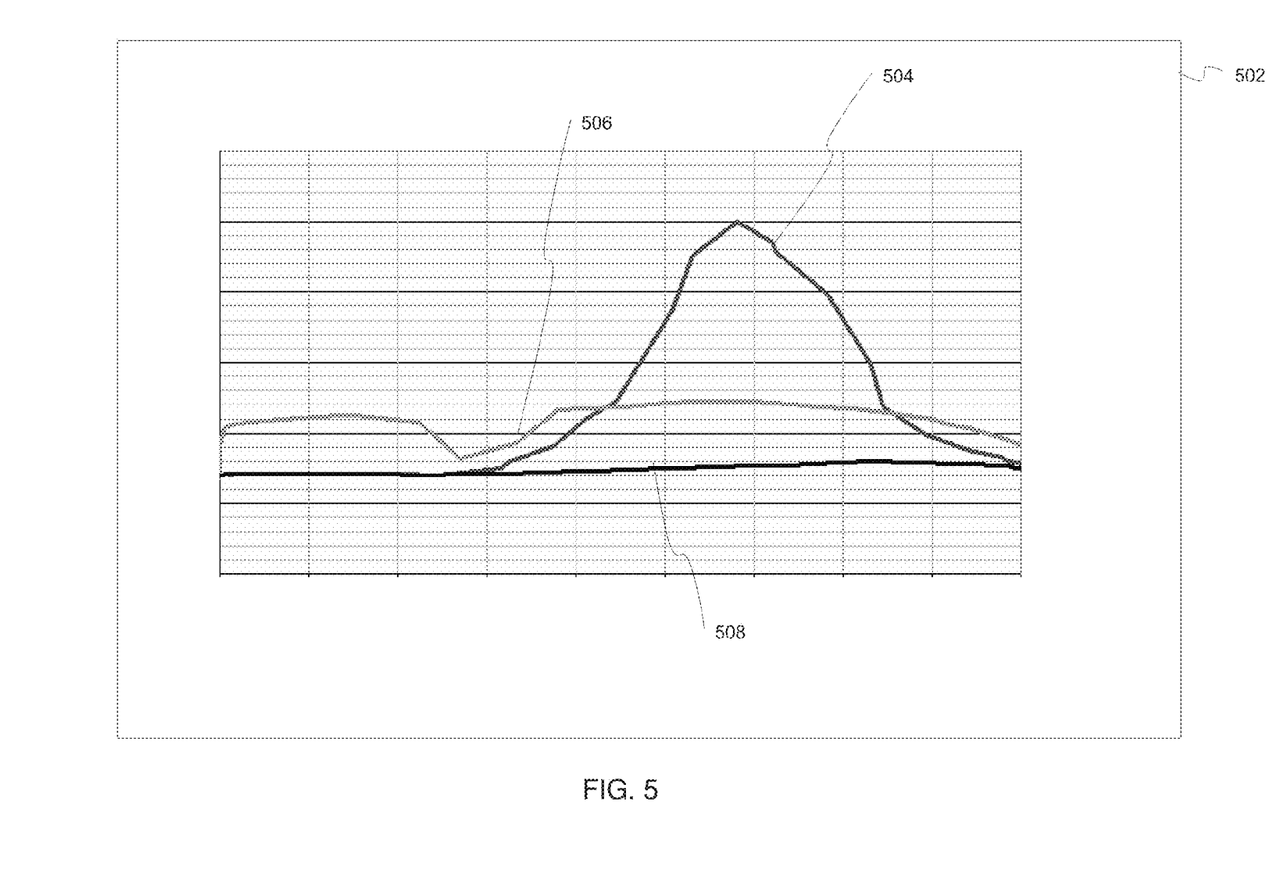

FIG. 5 illustrates an example screen 502 in which three data streams 504, 506 and 508 from sensors having the same measurement type are displayed concurrently. In this example, the concurrent display is provided on the same graph.

Figure 6:
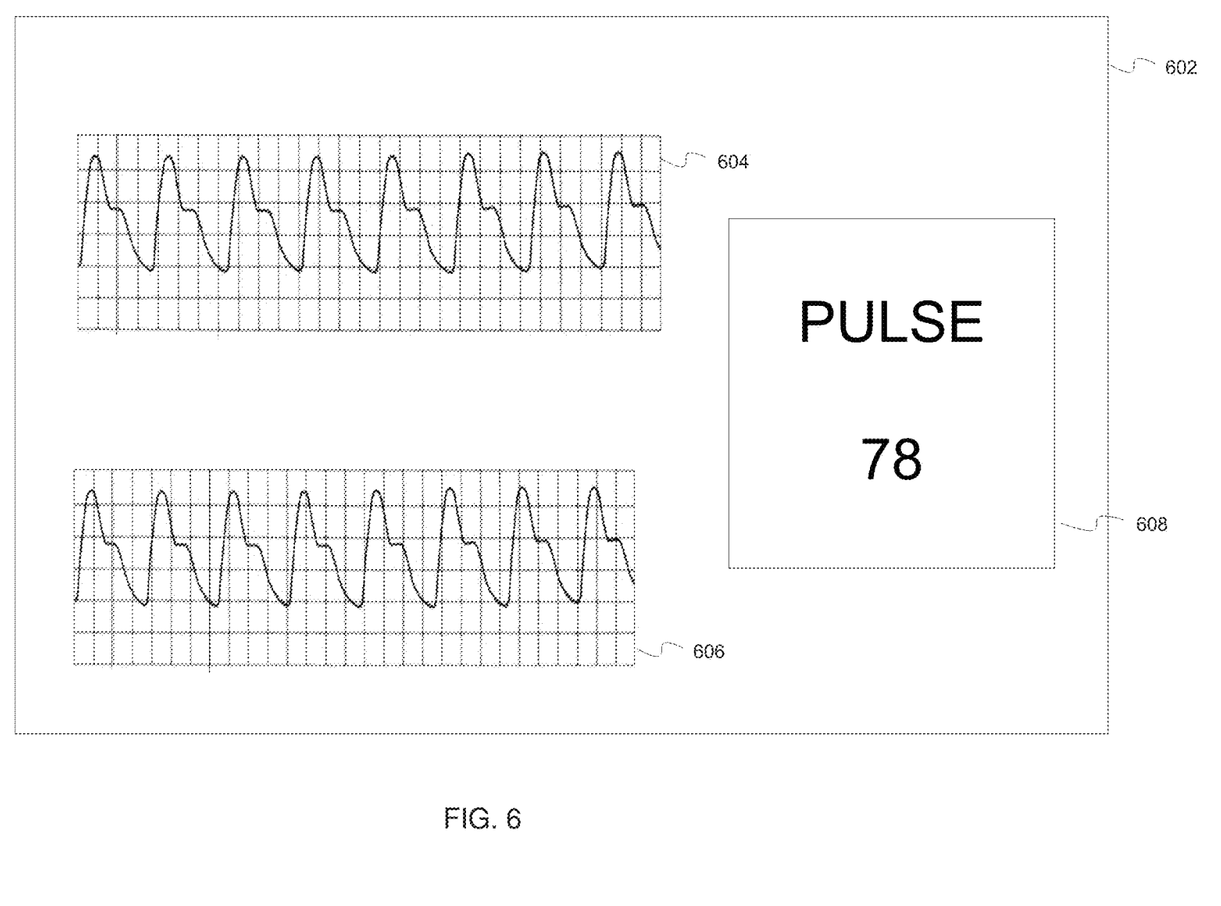

FIG. 6 illustrates an example screen 602 in which two data streams 604 and 606 have the same type and are displayed together on one side of the screen while a third data stream 608 (a pulse value) is of a different type from data streams 604 and 606 and is thus displayed on a different side of the screen.

Figure 7:
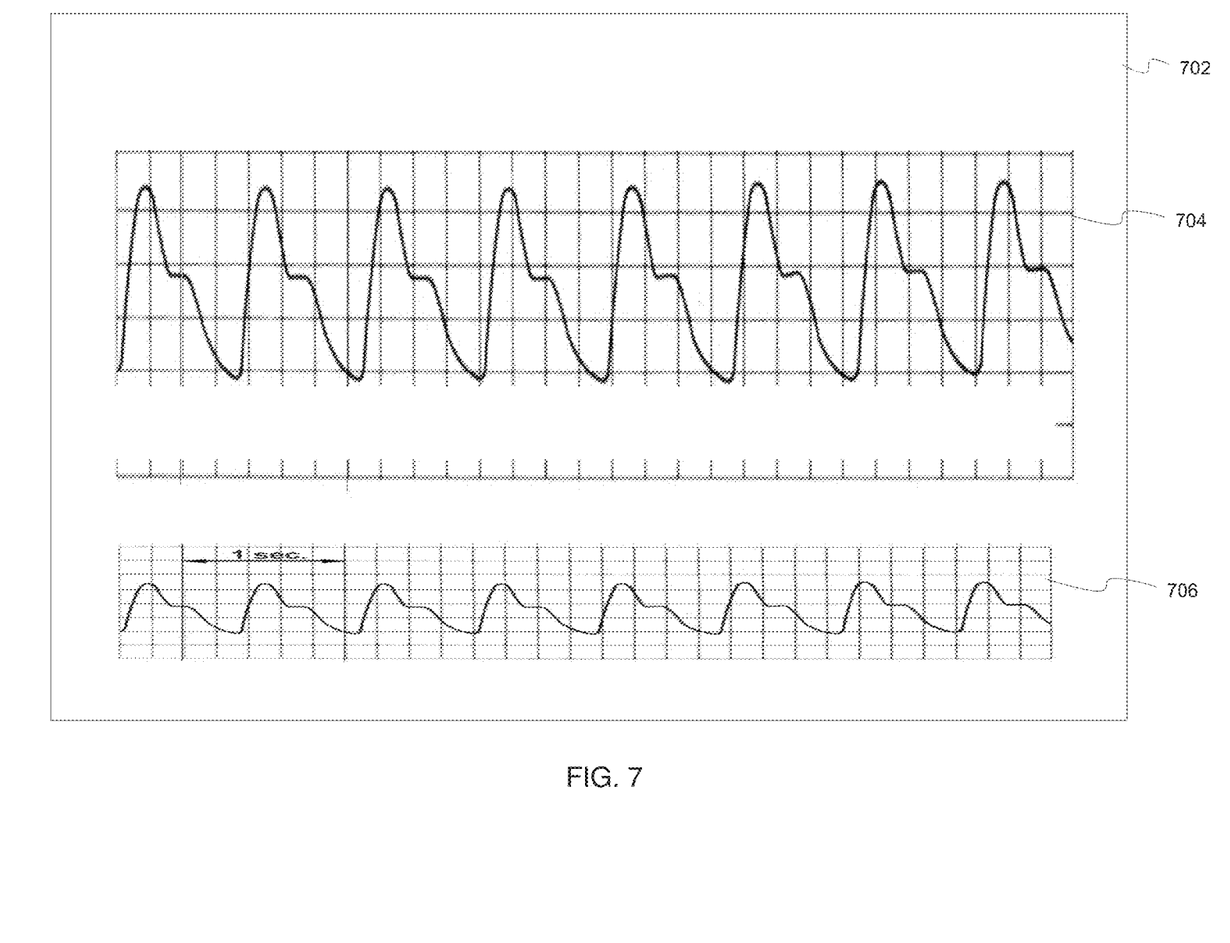

FIG. 7 illustrates an example screen 702 in which two data streams 704 and 706 having the same type are concurrently displayed, one adjacent the other. In the example, data stream 704 has entered an alarm condition or otherwise has had data cross a threshold value, and is thus displayed in a larger format than data stream 706.

Second Example Operations

Figure 8:
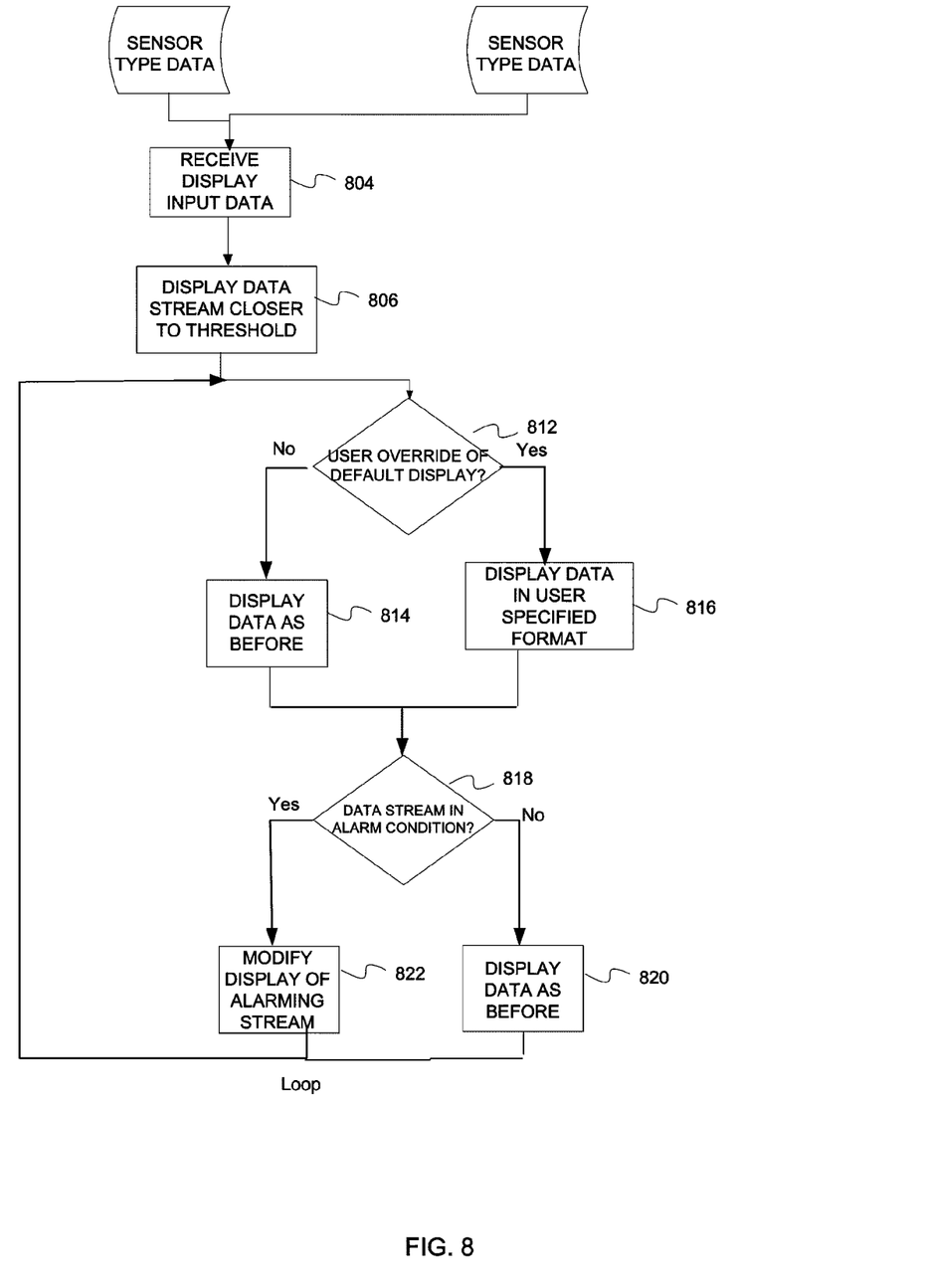
FIGS. 8-9 are flowcharts illustrating methods according to embodiments of the invention.

FIG. 8 is a flow chart illustrating method according to alternative embodiments of the invention for using measurement to modify a display. The method begins at block 804 by receiving data input for one or more of a plurality of sensors 106 for a system. Typically the data input may be measurement data provided by the sensor. In addition, the data input may include data identifying the type of sensor, or the type of measurement provided by the sensor.

At block 806 a check is made to determine which of the data streams is closer to one or more threshold values for that data type. These data types may be identical or different. The display then displays only the data stream that is closer to its threshold value.

In one example, the system has two data streams input and is displaying only one, in another example there may be 3, 4, 5, or more data stream input to the device and the device will display some subset of these data streams.

In various embodiments, the system may display each data stream in several formats, for example a value, a trend line, and/or a photoplethysmograph, and may display a subset of the formats for all data streams, for example the value, but only display another subset, for example the trend line, of the data stream closest to the threshold.

At block 812, a check is made to determine if a user has indicated that the display format determined by the system should be overridden. For example, a user may provide input such as a button press, menu selection, or activation of some user interface element to indicate that the display format determined automatically by the system should be overridden. If the default display format is to be overridden, the method proceeds to block 816 to display the data in an alternative format specified by the user. Otherwise, at block 814 the display format remains the same as determined by the system.

At block 818, a check is made to determine if any data stream, or data streams as in the alternate example above, closest the threshold has changed or indeed if one data stream has gone into an alarm condition. An alarm condition may be triggered by data values crossing a threshold or alarm limit. The threshold or alarm limit may be determined by data stored on the display unit 106, sensor pod 104 or sensor 106. The alarm condition may be detected by the display unit 102, sensor pod 104, or a sensor 106. If a data stream closest to its one or more threshold values has not changed, then at block 820 the display of the data continues in the previously determined format (either user-selected or system determined).

Otherwise, if the data stream closest to its one or more threshold values has changed or a data stream is in an alarm condition or otherwise crosses a predetermined threshold, then at block 822, the system modifies the display of data to display to give priority to that data stream as described for block 806.

Third Example Operations

Figure 9:
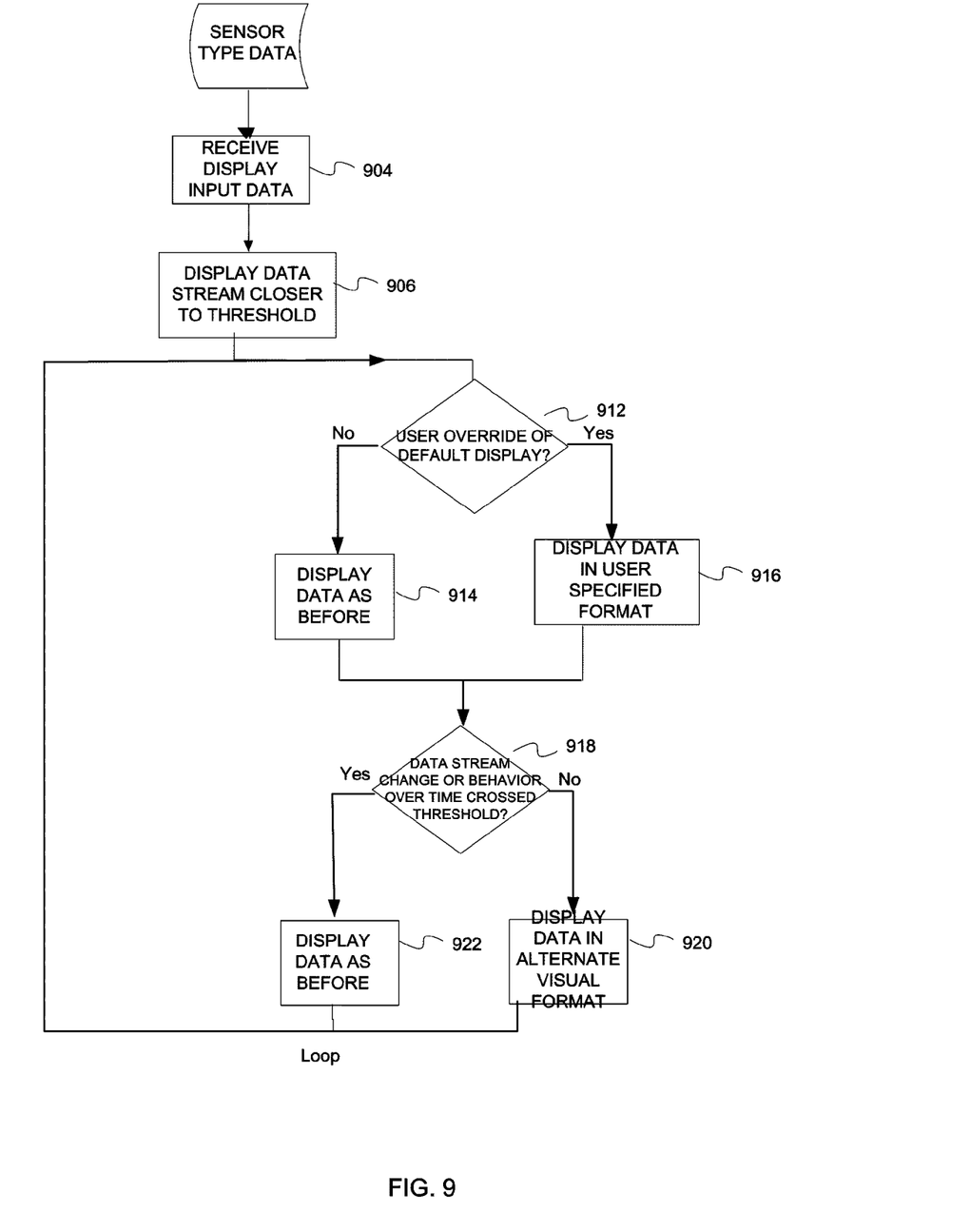

FIG. 9 is a flow chart illustrating a method for using measurement to modify a display according to further alternative embodiments. The method begins at block 904 by receiving data input for one or more of a plurality of sensors 106 for a system. Typically the data input may be measurement data provided by the sensor. In addition, the data input may include data identifying the type of sensor, or the type of measurement provided by the sensor.

At block 906 a check is made to determine the default display type for this data, for example a value, a trend line, and/or a photoplethysmograph, or some combination thereof.

In one example the system may have one data stream input, in another example there may be 2, 3, 4, or more data stream inputs to the device and the device may choose the display format of those data streams using the same procedure.

At block 912, a check is made to determine if a user has indicated that the display format determined by the system should be overridden. For example, a user may provide input such as a button press, menu selection, or activation of some user interface element to indicate that the display format determined automatically by the system should be overridden. If the default display format is to be overridden, the method proceeds to block 916 to display the data in an alternative format specified by the user. Otherwise, at block 914 the display format remains the same as determined by the system.

At block 918, a check is made to determine if the change of the data stream over time has met a certain threshold or an equipment alarm has been generated. Examples of this threshold include, absolute change, change per unit time, change duration, data spikes, etc. This list is not meant to be comprehensive and the display may be set to recognize other types of behaviors than those listed above. If this change criteria is met, then at block 920 the display makes an appropriate change to the display format, in one example this change in the display could be designed to highlight, and make easier to determine clinical relevance of, this change to the device user. For example if the blood oxygen saturation as measured by an oximetry sensor is consistent to within a set threshold, then display a photoplethysmograph, but if the consistency falls below a threshold, then display a trend line of change in saturation over time Otherwise, if the data stream behavior has not crossed a predetermined threshold, then at block 922, the system makes no change to the display of data and continues to display the data as chosen in block 906.

In the discussions above, reference has been made to changes in display based on sensor type or measurement. In various embodiments of the invention, it may be possible for the user to lock out these display changes. For example, a user may provide input such as a button press, menu selection, or activation of some user interface element to indicate that the display format should not change automatically.

In the discussions above, reference has been made to oximetry measurements. It should be noted that the systems and methods described above hare applicable to other measurement systems and other systems receiving and displaying data streams are within the scope of the inventive subject matter.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A method executable by one or more processors, the method comprising:
   at each of a plurality of pods, receiving data indicating a measurement type code from a sensor coupled to a particular pod, accessing calibration parameter information, receiving sensor output data for the sensor, and executing an algorithm at the particular pod to determine a processed measurement based on the type code, the calibration parameter information, and the sensor output data;
   at a display coupled to the plurality of pods, determining a display format for the display based on the processed measurement for the plurality of sensors;

checking for entry of a user input corresponding to the display format; and displaying values based on at least one processed measurement in accordance with the display format or, upon detecting the user input, displaying values based on at least one processed measurement in accordance with an alternative format.

2. The method of claim 1, wherein the display format includes a trend line.

3. The method of claim 1, wherein the display format includes a plethismograph.

4. The method of claim 1, wherein the display format includes a value.

5. The method of claim 1, wherein at least two of the plurality of sensors have the same measurement type and wherein determining the display format includes concurrently displaying data for the at least two of the plurality of sensors having the same data type.

6. The method of claim 5, wherein concurrently displaying data includes displaying the data from the at least two of the plurality of sensors adjacent to one another.

7. The method of claim 5, wherein concurrently displaying data includes displaying the data from the at least two of the plurality of sensors on the same graph.

8. The method of claim 1, and further comprising:
in response to determining that a value from a sensor has crossed a threshold, modifying the display format for the data stream from the sensor.

9. The method of claim 1, and further comprising:
in response to determining that an alarm has been generated, modifying the display format for the data stream from the sensor.

10. The method of claim 1, and further comprising:
in response to determining that a value from a sensor has crossed a threshold, modifying the display format for all data streams from the sensors to change a relative prominence of the different data streams.

11. The method of claim 1, and further comprising:
in response to determining that an alarm has been generated, modifying the display format for all data streams from the sensors to change a relative prominence of the different data streams.

12. The method of claim 1, and further comprising:
only displaying a subset of the sensor data streams and choosing the sensor data streams to display based on the distance of the sensor data from a threshold or having crossed a threshold.

13. The method of claim 12, and further comprising:
only displaying a subset of the sensor data streams possible data formats and choosing the sensor data streams data formats to display based on the distance of the sensor data from a threshold or having crossed a threshold.

14. The method of claim 1, and further comprising:
choosing which format or formats to display each data stream in based on the history or change in behavior of the data stream.

15. The method of claim 1 wherein checking for entry of the user input includes receiving an instruction to override the determined display format.

16. The method of claim 1 wherein checking for entry of the user input includes receiving an instruction to lock out changes in display format.

17. The method of claim 1 wherein displaying values includes displaying data in a plurality of formats based on one sensor.

18. The method of claim 1, and further comprising:
in response to determining that an alarm has been generated, displaying selected data using a display format in which the selected data is displayed with reduced prominence than other data of the display format.

19. The method of claim 18 wherein determining that an alarm has been generated includes detecting a disconnection or detecting a malfunction.

20. The method of claim 18 wherein determining that an alarm has been generated includes detecting a threshold crossing.

21. The method of claim 1, and further comprising:
in response to detecting a change in a configuration of sensors, using a display format including data from a new sensor.

22. A system comprising:
a plurality of sensors, each sensor coupled to a particular pod of a plurality of pods, each pod configured to store a measurement type code, access calibration parameter information and receive sensor output data for the sensor, the pod configured to execute an algorithm to determine a processed measurement based on the type code, the calibration parameter information, and the sensor output data; and
a display unit coupled to the plurality of pods, the display unit operable to:
receive the processed measurement for each of the plurality of sensors,
determine a display format for a display based on the processed measurement for the plurality of sensors,
check for entry of a user input corresponding to the display format, and
display values based on at least one processed measurement in accordance with the display format or, upon detecting the user input, displaying values based on at least one processed measurement in accordance with an alternative format.

23. The system of claim 22, wherein the measurement type code is determined according to sensor type data provided by the sensor.

24. The system of claim 22, and further comprising one or more sensor pods communicably coupling at least a subset of the plurality of sensors to the display unit.

25. The system of claim 24, wherein the measurement type code is determined according to sensor type data provided by the sensor pod.

26. A non-transitory machine-readable medium having stored thereon instructions that when executed cause one or more processors to perform operations comprising:
at each of a plurality of pods, receiving data indicating a measurement type code associated with a sensor coupled to a particular pod, accessing calibration parameter information, and receiving sensor output data for the sensor, and determining a processed measurement based on the type code, the calibration parameter information, and the sensor output data;
determining a display format for a display based on the processed measurement for the plurality of sensors;
checking for entry of a user input corresponding to the display format; and
displaying values based on at least one processed measurement in accordance with the display format or, upon detecting the user input, displaying values based on at least one processed measurement in accordance with an alternative format.

* * * * *